US011571656B2

(12) United States Patent
James et al.

(10) Patent No.: US 11,571,656 B2
(45) Date of Patent: Feb. 7, 2023

(54) TYPE 3 POROUS LIQUIDS

(71) Applicant: THE QUEEN'S UNIVERSITY OF BELFAST, Belfast (GB)

(72) Inventors: Stuart James, Belfast (GB); Min Ying Tsang, Belfast (GB); John Cahir, Belfast (GB)

(73) Assignee: THE QUEEN'S UNIVERSITY OF BELFAST, Belfast (GB)

( * ) Notice: Subject to any disclaimer, the term of this patent is extended or adjusted under 35 U.S.C. 154(b) by 0 days.

(21) Appl. No.: 17/052,747

(22) PCT Filed: Nov. 1, 2018

(86) PCT No.: PCT/GB2018/053168
§ 371 (c)(1),
(2) Date: Nov. 3, 2020

(87) PCT Pub. No.: WO2019/215419
PCT Pub. Date: Nov. 14, 2019

(65) Prior Publication Data
US 2021/0229068 A1 Jul. 29, 2021

(30) Foreign Application Priority Data

May 11, 2018 (WO) ................ PCT/GB2018/051279

(51) Int. Cl.
*B01D 53/10* (2006.01)
*B01D 53/02* (2006.01)
(Continued)

(52) U.S. Cl.
CPC ............. *B01D 53/10* (2013.01); *B01D 15/02* (2013.01); *B01D 53/025* (2013.01);
(Continued)

(58) Field of Classification Search
CPC .......... B01D 53/025; B01D 2252/2026; B01D 2253/108; B01D 2257/504; B01J 20/18; B01J 20/226
(Continued)

(56) References Cited

U.S. PATENT DOCUMENTS 5,075,023 A 12/1991 Fukuyama et al.
6,022,487 A 2/2000 Daume et al.
(Continued)

FOREIGN PATENT DOCUMENTS

DE 10 2005 023 857 A2 11/2006
EP 0 372 366 A1 6/1990
(Continued)

OTHER PUBLICATIONS

Combined Search and Examination Report for GB appln No. GB1707674.6 dated Nov. 6, 2017.
(Continued)

*Primary Examiner* — Anita Nassiri-Motlagh
(74) *Attorney, Agent, or Firm* — Foley & Lardner LLP

(57) ABSTRACT

This invention relates to a dispersion comprising porous particles dispersed in a liquid phase, wherein the porous particles comprise a zeolite and the liquid phase is a size-excluded liquid. The invention also relates to a method of adsorbing a gas into a liquid, comprising at least the step of bringing the gas into contact with the dispersion. In addition, the invention relates to an assemblage of the dispersion, the zeolite comprising a cavity and a gas contained within the cavity.

20 Claims, 8 Drawing Sheets

(51) Int. Cl.

| | | |
|---|---|---|
| *B01J 20/18* | (2006.01) | |
| *B01J 20/22* | (2006.01) | |
| *B01D 15/02* | (2006.01) | |
| *B01D 53/14* | (2006.01) | |
| *B01J 20/20* | (2006.01) | |

(52) U.S. Cl.
CPC .......... *B01D 53/1493* (2013.01); *B01J 20/18* (2013.01); *B01J 20/226* (2013.01); *B01D 53/1475* (2013.01); *B01D 2252/205* (2013.01); *B01D 2252/2023* (2013.01); *B01D 2252/2026* (2013.01); *B01D 2252/2028* (2013.01); *B01D 2253/102* (2013.01); *B01D 2253/108* (2013.01); *B01D 2253/202* (2013.01); *B01D 2253/204* (2013.01); *B01D 2256/245* (2013.01); *B01D 2257/102* (2013.01); *B01D 2257/504* (2013.01); *B01D 2257/7025* (2013.01); *B01J 20/205* (2013.01); *Y02C 20/20* (2013.01); *Y02C 20/40* (2020.08)

(58) Field of Classification Search
USPC .......................................... 502/407
See application file for complete search history.

(56) References Cited

U.S. PATENT DOCUMENTS

| | | |
|---|---|---|
| 6,540,936 B1 | 4/2003 | Takagi et al. |
| 2003/0050217 A1 | 3/2003 | Instone et al. |
| 2013/0274087 A1 | 10/2013 | Da Silva Pinto et al. |
| 2014/0099245 A1 | 4/2014 | Hamad |
| 2014/0157984 A1 | 6/2014 | Deckman et al. |
| 2017/0173518 A1 | 6/2017 | Chen et al. |

FOREIGN PATENT DOCUMENTS

| | | |
|---|---|---|
| EP | 0 374 525 A1 | 6/1990 |
| EP | 0 425 149 A2 | 5/1991 |
| GB | 2 219 598 A | 12/1989 |
| WO | WO-2010/106133 A1 | 9/2010 |
| WO | WO-2012/118434 A1 | 9/2012 |
| WO | WO-2015/165143 A1 | 11/2015 |

OTHER PUBLICATIONS

Diestel L et al: "Comparative permeation studies on three supported membranes: Pure ZIF-8, pure polymethylphenylsiloxane, and mixed matrix membranes",Microporous and Mesoporous Materials, vol. 189, Sep. 21, 2013 (Sep. 21, 2013), pp. 210-215.

International Search Report and Written Opinion on PCT/GB2018/051279 dated Sep. 12, 2018.

International Search Report and Written Opinion on PCT/GB2018/053168 dated Dec. 12, 2018.

Klochko B N et al: "Study of the Insulating Properties of Carbon Black in Suspensions Modelling Solid-Phase Composites Based on Phenolic Resins", International Polymer Science and Technology, Rapra Technology, Shrewabury, GB, vol. 24, No. 9, Jan. 1, 1997 (Jan. 1, 1997), pp. T95-T97.

Markarian Nikolai et al: Particle motions and segregation in dielectrophoretic microfluidics 11, Journal of Applied Physics, American Institute of Physics, US, vol. 94, No. 6,Sep. 15, 2003 (Sep. 15, 2003).

Cahir et al., "Type 3 porous liquids based on non-ionic liquid phases—a broad and tailorable platform of selective, fluid gas sorbents", Chem. Sci., 2020, vol. 11, p. 2077-2084.

Dusselier et al., "Small-Pore Zeolites: Synthesis and Catalysis", Chem. Rev., 2018, vol. 18, p. 5265-5329.

TYPE 3 POROUS LIQUIDS

CROSS-REFERENCE TO RELATED APPLICATIONS

This application is a U.S. National Stage Application under 35 U.S.C. § 371 of International Application No. PCT/GB2018/053168, filed on Nov. 1, 2018, which claims priority to International Application No. PCT/GB2018/051279, filed on May 11, 2018, the content of each of which is incorporated herein by reference in its entirety.

This invention relates to dispersions comprising porous particles dispersed in a liquid phase, wherein the porous particles comprise a zeolite and the liquid phase is a size-excluded liquid, as well as to methods of preparing such dispersions. The invention also relates to a method of adsorbing a gas into a liquid, comprising at least the step of bringing the gas into contact with the dispersions. In addition, the invention relates to an assemblage of such a dispersion, the zeolite comprising a cavity and a gas contained within the cavity.

BACKGROUND

Liquid phases for the dissolution of gases are known. Solutions of various amines in water, or other solvents, are known to dissolve $CO_2$ and are applied industrially in natural gas "sweetening". However, these methodologies comprise the use of toxic materials; are corrosive towards steel, which limits their uses industrially; and require large amounts of energy to regenerate. They are also non-specific and therefore cannot be used for specific or targeted gas separation. An glycol ether solvent type called Genosorb is utilised in industry for separating $CO_2$ from $CH_4$. However, the $CO_2$ uptake of Genosorb is limited, as is its selectivity for $CO_2$ over $CH_4$.

Porous solids such as zeolites are useful in molecular separation due to their permanent porosity. Porous solid adsorbents have significant advantages, for instance in terms of lower energy penalties in adsorption-desorption cycles when compared with their liquid counterparts, but they are difficult to incorporate into conventional flow processes. The use of solid zeolite Rho as an adsorbent for $CO_2/CH_4$ separation is described in Palomino et al, *Chem. Commun.*, 2012, 48, 215-217.

Porous liquids (liquids with permanent porosity, or dispersions) for use in molecular separation have subsequently been developed. These porous liquids have been categorised into three different types (*Chem. Eur. J.*, 2007, 13, 3020) as follows:
  Type 1—neat liquid hosts comprising molecules having an internal cavity, and that the molecules cannot collapse or interpenetrate,
  Type 2—host molecules having an internal cavity, the molecules being dissolved in a solvents that cannot occupy the host's cavities, and
  Type 3—particles of a host molecular framework dispersed in a liquid that cannot occupy the host's cavities.
Thus, each type of porous liquid comprises a "host" having a cavity into which, for example, gas molecules could be absorbed.

Disadvantages of known porous liquids include that their preparation involves several steps and requires highly specialised expertise. The solvents used to prepare them are often volatile, which restricts their use in applications utilising reduced pressure to remove dissolved gases. In addition, the solubility of gases in these liquids is difficult to predict due to a lack of available data.

Liquids having improved properties, particularly high $CO_2$ uptake and improved selectivity for $CO_2$ over $CH_4$, are sought. This can provide improved efficiency in industrial processes where these properties are useful, for example by reducing circulation rates.

STATEMENT OF INVENTION

This invention relates to a dispersion comprising porous particles dispersed in a liquid phase, wherein the porous particles comprise a zeolite and the liquid phase is a size-excluded liquid.

Generally, a dispersion is a system in which particles are dispersed in a continuous phase of a different composition. The term "dispersion" is used in relation to the invention to refer to a system in which particles of a porous solid are dispersed in a liquid phase or medium. The dispersion may optionally comprise additives, such as surfactants, in order to increase the stability of the dispersion. Such additives are known to those skilled in the art.

It is known that some dispersions are time dependent before the start of separation of the solid particles in the liquid phase or medium, possibly based on requiring some form of agitation to continue as a dispersion. The present invention is not limited to the stability or transience of the dispersion.

More particularly, the dispersion may be a type 3 porous liquid.

In particular, the porous particles may be microparticles and/or nanoparticles. More particularly, the porous particles may be microparticles. Microparticles are generally defined as particles having a mean diameter in the range 0.1-100 μm (ie 100-100,000 nm). More particularly, the porous particles may have a mean diameter in the range 0.1-2 μm (ie 100-2000 nm). Nanoparticles are generally defined as particles having a mean diameter in the range 1-100 nm.

More particularly, the pores of the porous particles may comprise micropores (ie that they have a pore diameter of less than 2 nm), mesopores (ie that they have a pore diameter in the range 2-50 nm) or a mixture of micropores and mesopores.

In some embodiments, the zeolite may be selected from zeolite Rho, zeolite Na-Rho, ECR-18, ZSM-25 and PST-20. More particularly, the zeolite may be zeolite Rho.

Zeolites may be generally defined as aluminosilicate materials which are crystalline and porous. Zeolite Rho is a type of zeolite which may be defined as having an Si/Al ratio in the range 1-8, more particularly 2-6. In particular, zeolite Rho may have a mean pore diameter of 1.9-6.0 Angstroms, more particularly 2.9-4.0 Angstroms, even more particularly about 3.6 Angstroms. In particular, it may have a pore volume of 0.22-0.44 $cm^3g^{-1}$, more particularly 0.24-0.33 $cm^3g^{-1}$, even more particularly about 0.26 $cm^3g^{-1}$. More particularly, zeolite Rho may have a body-centred cubic crystal structure.

A size-excluded liquid may be defined in the context of the invention as a liquid which is excluded from the pores (ie the cavities) within the porous particles. This can be because the size-excluded liquid has a molecular size which is too large to enter the pores of the porous particles. Alternatively, entry into the pores of the porous particles may be thermodynamically or kinetically unfavourable.

In particular, the size-excluded liquid may be selected from a glycol; 15-crown-5; a tertiary amine having substituted or unsubstituted aryl or alkyl substituents, for example each substituent can individually be $C_6$-$C_{10}$ substituted or unsubstituted aryl or alkyl; the tertiary amine may be a trialkylamine where each alkyl group is individually $C_6$-$C_{10}$ alkyl, more particularly $C_7$-$C_9$ alkyl, for example trioctylamine; 2-(tert-butylamino)ethyl methacrylate; a trialkyl phosphate where each alkyl group is individually $C_2$-$C_6$ alkyl, more particularly $C_3$-$C_5$ alkyl, for example tributyl phosphate; a dialkyl phthalate where each alkyl group is individually $C_6$-$C_{10}$ alkyl, more particularly $C_7$-$C_9$ alkyl, for example dioctyl phthalate; and bis(2-ethylhexyl) sebacate. More particularly, the glycol may be a polyalkylene glycol. In particular, the polyalkylene glycol may be a polyethylene glycol or a polypropylene glycol. More particularly, the polyethylene glycol may be selected from a polyethylene glycol dialkyl ether and a polyethylene glycol carboxylate. In particular, the polyethylene glycol dialkyl ether may be selected from a polyethylene glycol dimethyl ether and a polyethylene glycol dibutyl ether.

The polyethylene glycol dimethyl ether may be in the form of a mixture with one or more other components. Example mixtures include:
(i) polyethylene glycol dimethyl ether with triethylene glycol dimethyl ether and bis(2-(2-methoxylethoxyl)ethyl)ether (for example, Genosorb 1753—triethylene glycol dimethyl ether (4.9% w/w); bis(2-(2-methoxylethoxyl)ethyl)ether (<=13% w/w));
(ii) polyethylene glycol dimethyl ether with triethylene glycol dimethyl ether (for example, Genosorb 1900—triethylene glycol dimethyl ether (4.9% w/w)); and
(iii) polyethylene glycol dimethyl ether with diaryl-p-penylenediamines, triethylene glycol dimethyl ether and bis(2-(2-methoxylethoxyl)ethyl)ether (for example, Genosorb 300—mixture of diaryl-p-penylenediamines (<1% w/w); triethylene glycol dimethyl ether (4.9% w/w); bis(2-(2-methoxylethoxyl)ethyl)ether (<=13% w/w)).

The polyethylene glycol dibutyl ether may be in the form of a mixture with one or more other components. An example mixtures is polyethylene glycol dibutyl ether with diaryl-p-penylenediamines (for example, Genosorb 1843—mixture of diaryl-p-penylenediamines>=0.25-<1% w/w)).

In particular, the zeolite may be zeolite Rho and the size-excluded liquid may be a polyethylene glycol dimethyl ether, a polyethylene glycol dibutyl ether, 15-crown-5 or bis(2-ethylhexyl) sebacate. More particularly, the zeolite may be zeolite Rho and the size-excluded liquid may be a polyethylene glycol dimethyl ether. Even more particularly, the zeolite may be zeolite Rho and the size-excluded liquid may be a polyethylene glycol dimethyl ether in the form of a mixture with one or more other components as defined above.

In particular, the dispersion may comprise 0.1-50 wt % of the porous particles, more particularly 5-40 wt %. Even more particularly, the dispersion may comprise 10-30 wt % of the porous particles, more particularly 10-15 wt %.

In the dispersion according to the present invention, the pores of the porous particles may be accessible to a gas. Optionally, the gas may be $CO_2$, $CH_4$, $N_2$, $C_2H_4$, $C_2H_6$, Xe, $SF_6$, $C_3H_8$ or $H_2$, or a mixture thereof. More particularly, the gas may be selected from $CO_2$ and $CH_4$, even more particularly the gas may be $CO_2$.

According to a further aspect of the present invention, there is provided a method of adsorbing a gas into a liquid, comprising at least the step of bringing the gas into contact with a dispersion comprising porous particles dispersed in a liquid phase, wherein the porous particles comprise a zeolite and the liquid phase is a size-excluded liquid. More particularly, the dispersion may be as defined above.

In an embodiment, the gas is in a gas mixture and the gas is selectively adsorbed by the dispersion.

In particular, the gas may be $CO_2$, $CH_4$, $N_2$, $C_2H_4$, $C_2H_6$, Xe, $SF_6$, $C_3H_8$ or $H_2$, or a mixture thereof. More particularly, the gas may be selected from $CO_2$ and $CH_4$, even more particularly the gas may be $CO_2$.

In particular, the method of adsorbing a gas into a liquid may additionally comprise, after the step of bringing the gas into contact with the dispersion, the step of regenerating the dispersion. More particularly, the regeneration step may comprise applying a vacuum to the dispersion. In particular, the regeneration step may comprise heating the dispersion to a temperature of at least 30° C., more particularly at least 40° C., even more particularly at least 50° C. In particular, the steps of applying the vacuum and heating may be carried out at the same time. More particularly, the steps of applying the vacuum and heating may be carried out for at least 10 minutes, even more particularly at least 20 minutes, more particularly at least 30 minutes.

According to a further aspect of the present invention, there is provided a method of preparing a dispersion comprising at least the step of: mixing (i) porous particles comprising a zeolite, and (ii) a size-excluded liquid. The porous particles may be as defined above. The size-excluded liquid may be as defined above. More particularly, the dispersion formed by the method may be as defined above.

Optionally, the mixing includes agitating, stirring, sonication or grinding or a combination thereof. More particularly, the method may comprise stirring the mixture.

According to a further aspect of the present invention, there is provided an assemblage of a dispersion comprising porous particles dispersed in a liquid phase, wherein the porous particles comprise a zeolite and the liquid phase is a size-excluded liquid, wherein the zeolite comprising a cavity and a gas contained within the cavity. More particularly, the gas may be $CO_2$, $CH_4$, $N_2$, $C_2H_4$, $C_2H_6$, Xe, $SF_6$, $C_3H_8$ or $H_2$, or a mixture thereof. In particular, the gas may be selected from $CO_2$ and $CH_4$, even more particularly the gas may be $CO_2$.

BRIEF DESCRIPTION OF THE DRAWINGS

This invention will be further described by reference to the following Figures which are not intended to limit the scope of the invention claimed, in which:

EXAMPLES

Synthesis

Figure 1A:
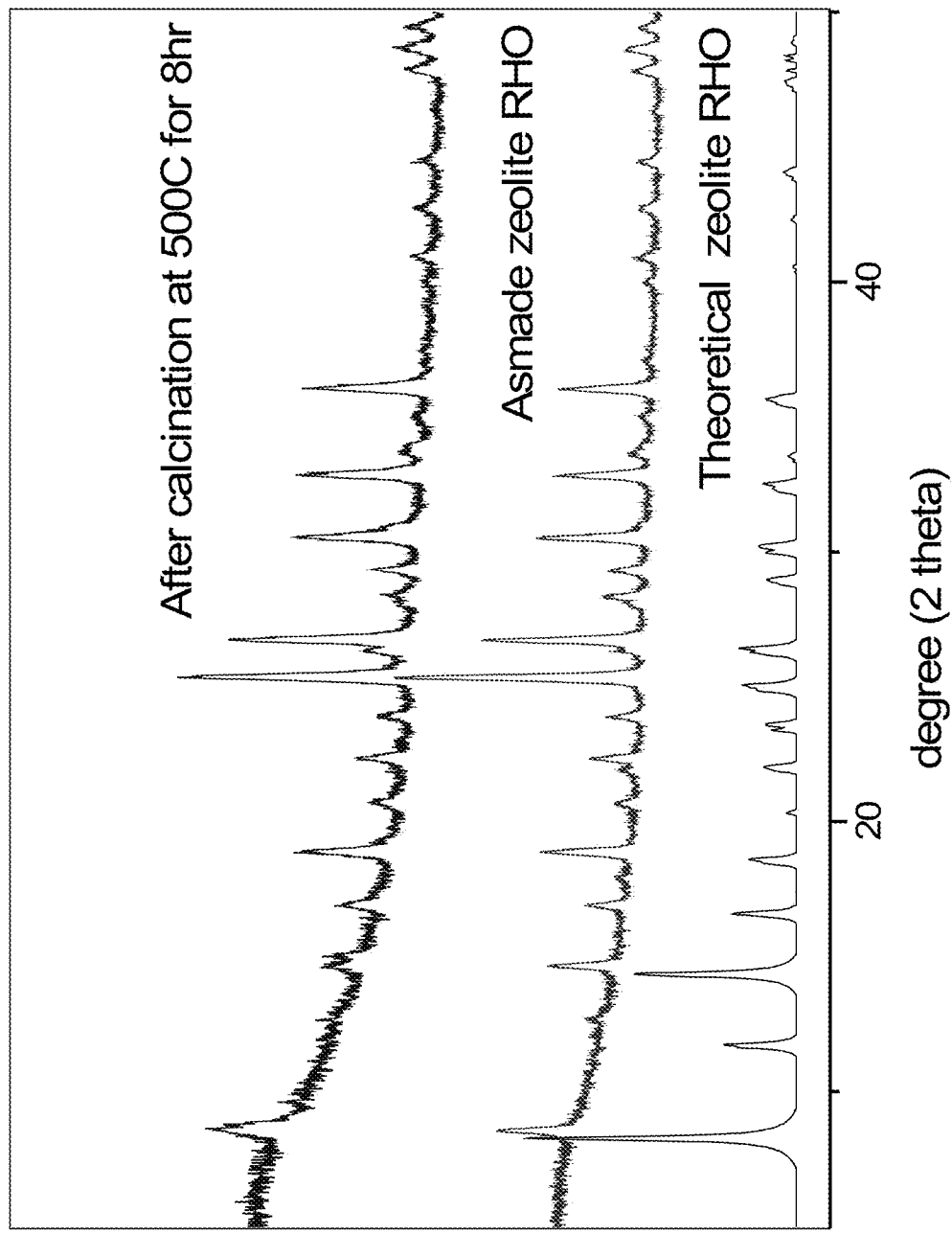
FIG. 1A shows Powder X-Ray Diffraction (PXRD) data comparing the theoretical pattern for zeolite Rho and the pattern for the zeolite Rho made in the examples both before and after calcination at 500° C. for 8 hours.

There are two reported methods to synthesize zeolite Rho according to literature. For the current study of zeolite Rho, method 1 was used to synthesize high crystallinity material.

Method 1 (see Palomino et al, *Chem. Commun.*, 2012, 48, 215-217): 18-crown-6 ether (4.70 g, 17.78 mmol), cesium hydroxide (3.53 g, 23.54 mmol) and sodium hydroxide (1.70 g, 42.50 mmol) were dissolved in 30 ml of deionised water. Sodium aluminate (6.60 g, 32.65 mmol) was added to this solution and stirred until fully dissolved. Ludox AS-40 colloidal silica (52.5 g, 873.8 mmol) was then added. The resulting mixture was stirred overnight at room temperature under atmospheric pressure. The obtained precursor mixture was then placed in a Teflon-lined stainless steel autoclave at 398K for 3 days for crystallization. The resulting zeolite Rho was then washed with deionised water by filtration until neutral and calcined at 773K for approximately 3 hours to remove the organic template (18-crown-6).

Method 2 (see Mousavi et al, *Ceramics International*, 39 (2013), 7149-7158): Caesium hydroxide (1.91 g, 12.75 mmol) and sodium hydroxide (3.274 g, 81.75 mmol) were dissolved in 20 ml of deionised water. Sodium aluminate (3.94 g, 19.51 mmol) was added to this solution and stirred until fully dissolved. Ludox AS-40 colloidal silica (33.88 g, 563.9 mmol) was then added. The resulting mixture was stirred overnight at room temperature under atmospheric pressure. The obtained precursor mixture was then placed in a Teflon-lined stainless steel autoclave at 358K in an oil bath for 7 days for crystallization. The resulting zeolite Rho was then washed with deionised water by filtration until neutral.

Method 3: Caesium hydroxide (1.91 g, 12.75 mmol) and sodium hydroxide (3.274 g, 81.75 mmol) were dissolved in 20 ml of deionised water. Sodium aluminate (3.94 g, 19.51 mmol) was added to this solution and stirred until fully dissolved. Ludox AS-40 colloidal silica (33.88 g, 563.9 mmol) was then added. 400 mg of crystalline zeolite Rho (seeding) was then added to the resulting mixture and stirred overnight at room temperature under atmospheric pressure. The obtained precursor mixture was then placed in a Teflon flask at 358K in oil bath for 7 days for crystallization. The resulting zeolite Rho was then washed with deionised water by filtration until neutral.

The zeolite Rho data below is a result of testing carried out on material made by Method 1.

The dispersion (also sometimes referred to as a "porous liquid") was prepared by mixing Genosorb 1753 and zeolite Rho by stirring the components in laboratory flask until formation of homogeneous dispersion, typically about 15 mins. Other missing techniques such as grinding, milling or sonicating can also be used.

Characterisation

Figure 1B:
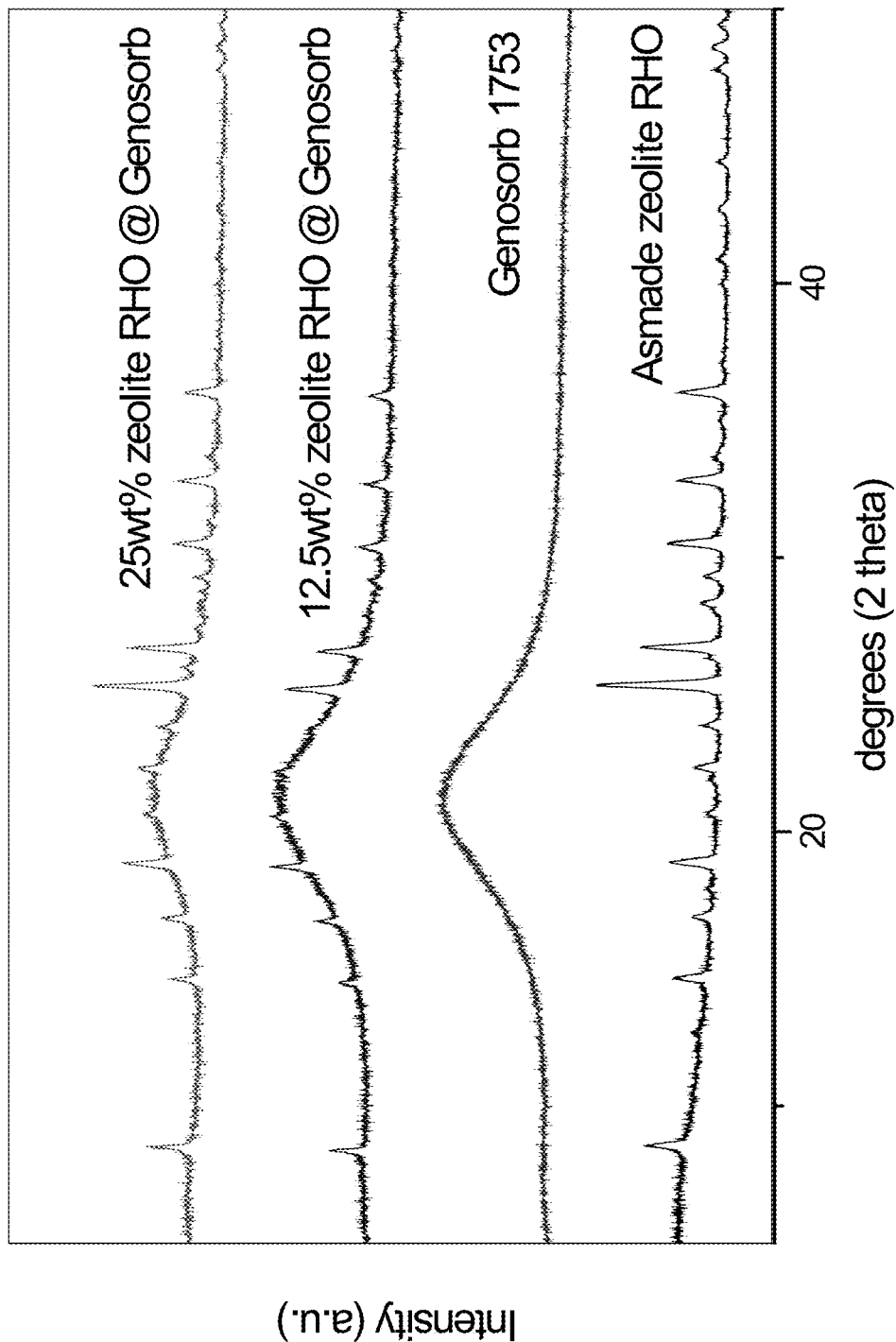
FIG. 1B shows PXRD data comparing as made zeolite Rho, Genosorb 1753, and 12.5 wt % and 25 wt % dispersions of zeolite Rho in Genosorb 1753.

The zeolite Rho-Genosorb 1753 porous liquid was characterized by Powder X-Ray Diffractometer (PXRD), Thermo-gravimetric Analysis (TGA) and Infrared Spectroscopy (IR). The PXRD spectrum of zeolite Rho in Genosorb porous liquid (see FIG. 1B) shows an identical pattern to that of the original zeolite Rho (see both FIGS. 1A and 1B). This confirms that the zeolite components remain intact and crystalline after mixing with Genosorb.

Figure 2:
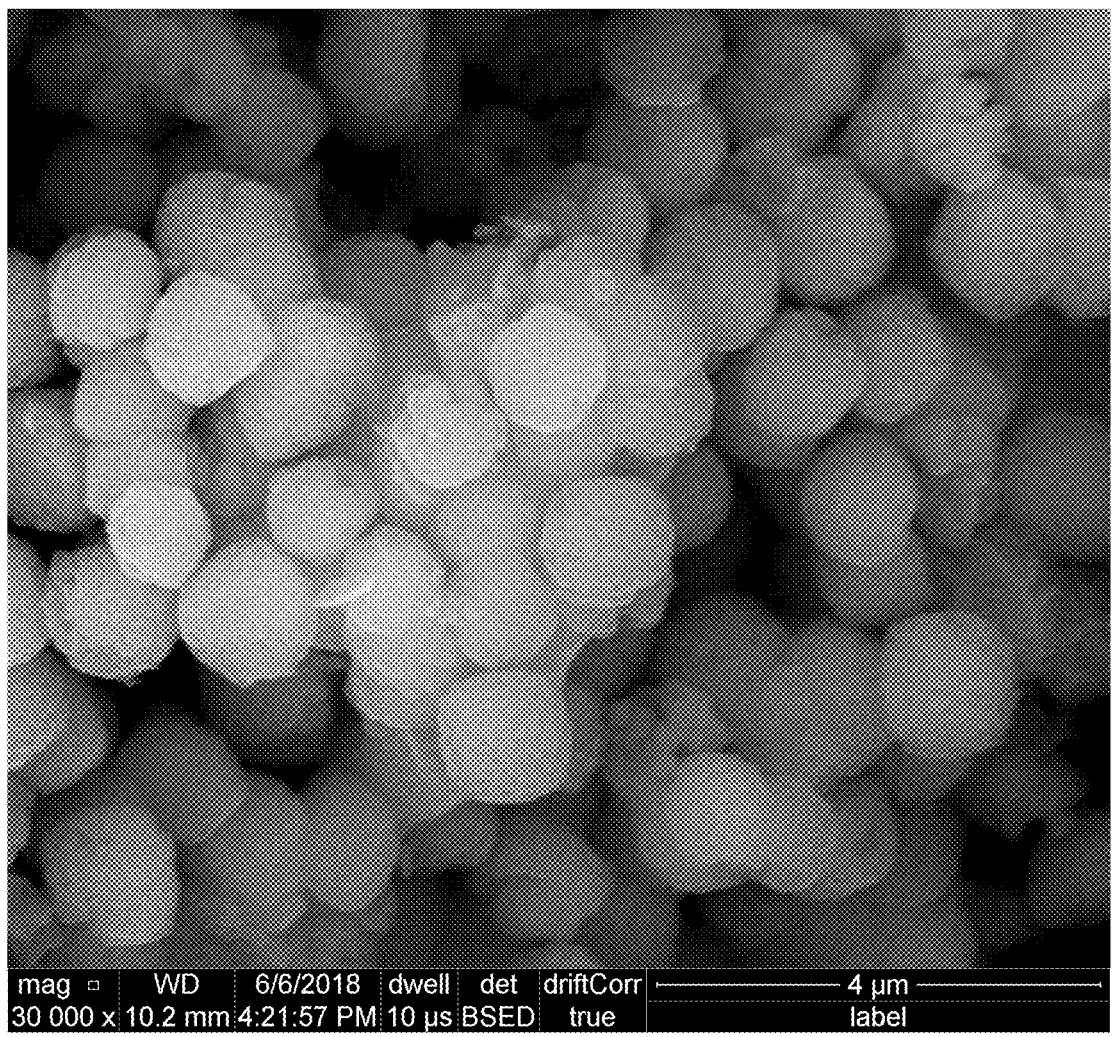
FIG. 2 shows a Scanning Electron Microscope (SEM) image of the as made zeolite Rho.

An SEM image of the original zeolite Rho (ie not as a dispersion) is shown in FIG. 2. This demonstrates that the particle size is around 1.0-1.2 μm.

Gas Uptake Studies

Low pressure measurement (c.a. 0.8 bar condition; 25° C.)—Gas solubility studies were carried out by using a volumetric technique based on an isochoric method (see S. L. James et. al.; *Nature*, 527, 216).

All the measurements were carried out at around 0.8 bar and 298K. The results show that the addition of zeolite Rho to commercial solvent Genosorb 1753 increases the $CO_2$/$CH_4$ selectivity significantly (see Table 1 below). The zeolite Rho does not lose its gas capacity and the gas uptake is predictable.

TABLE 1

|  | Genosorb 1753 | 12.5 wt % Zeolite Rho in Genosorb | 25 wt % Zeolite Rho in Genosorb |
|---|---|---|---|
| $CO_2$ solubility* | 0.209 mmol/g (9.234 mg/g) | 0.475 mmol/g (20.923 mg/g) | 0.738 mmol/g (32.499 mg/g) |
| $CH_4$ solubility[†] | 0.055 mmol/g (0.882 mg/g) | 0.043 mmol/g (0.6463 mg/g) | 0.027 mmol/g (0.4383 mg/g) |
| $CO_2$/$CH_4$ | c.a. 3.8 | c.a. 10.32 | c.a. 23.06 |

*from large volume gas rig (V2)

[†]from small volume gas rig (V1), error is large due to small amount of $CH_4$ uptake High Pressure measurement (1-5 bar, 25° C.-75° C.)—High pressure gas solubility studies were carried out by using Parr reactor based on a mass flow (see A. M. Orozco et. al., *Industrial Crops and products*, 2013, 44, 1 for a similar experimental set-up).

Figure 3:
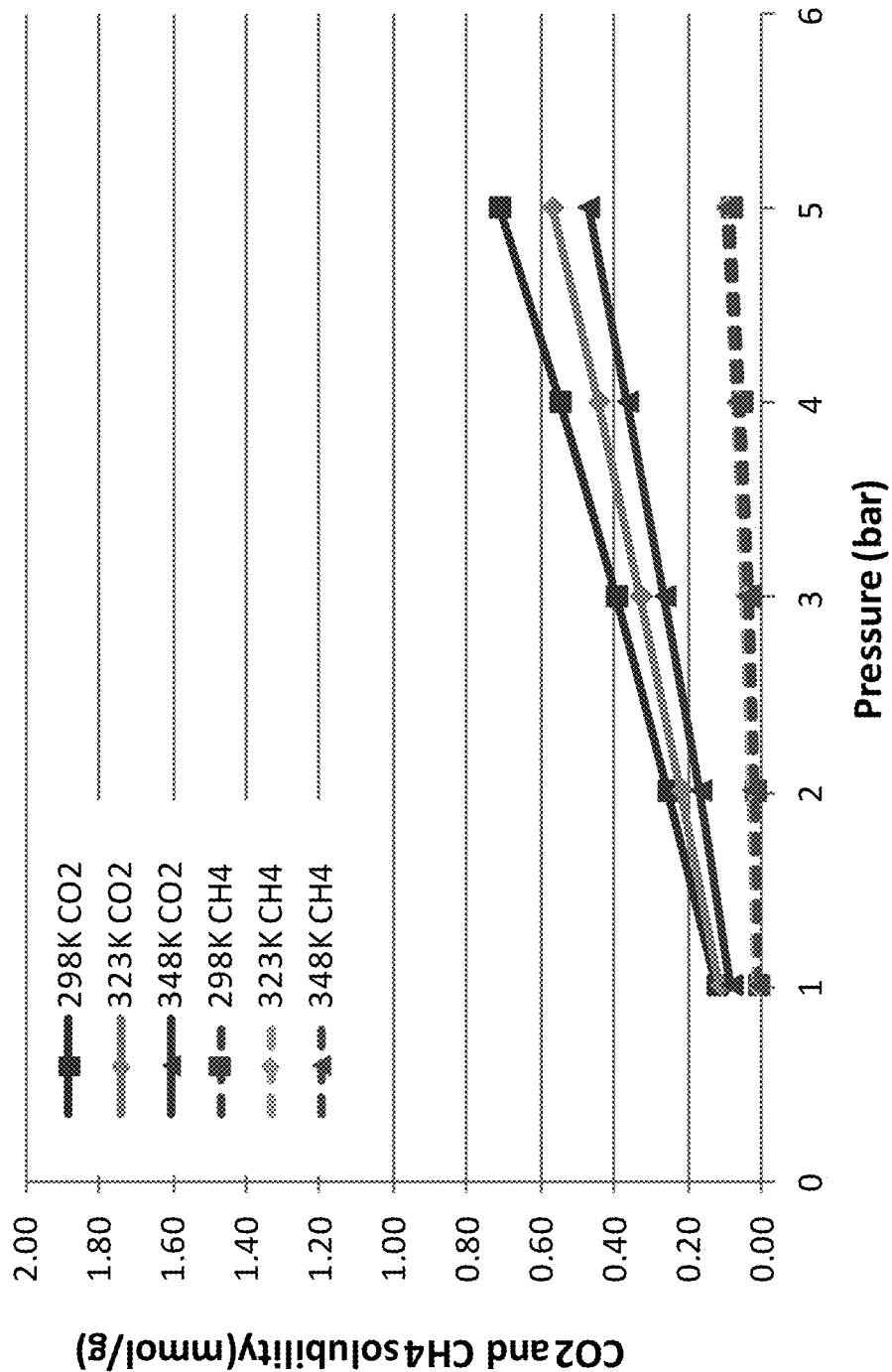
FIG. 3 shows the $CO_2$ uptake of Genosorb 1753 at three different temperatures and at pressures of from 1-5 bar.
Figure 4:
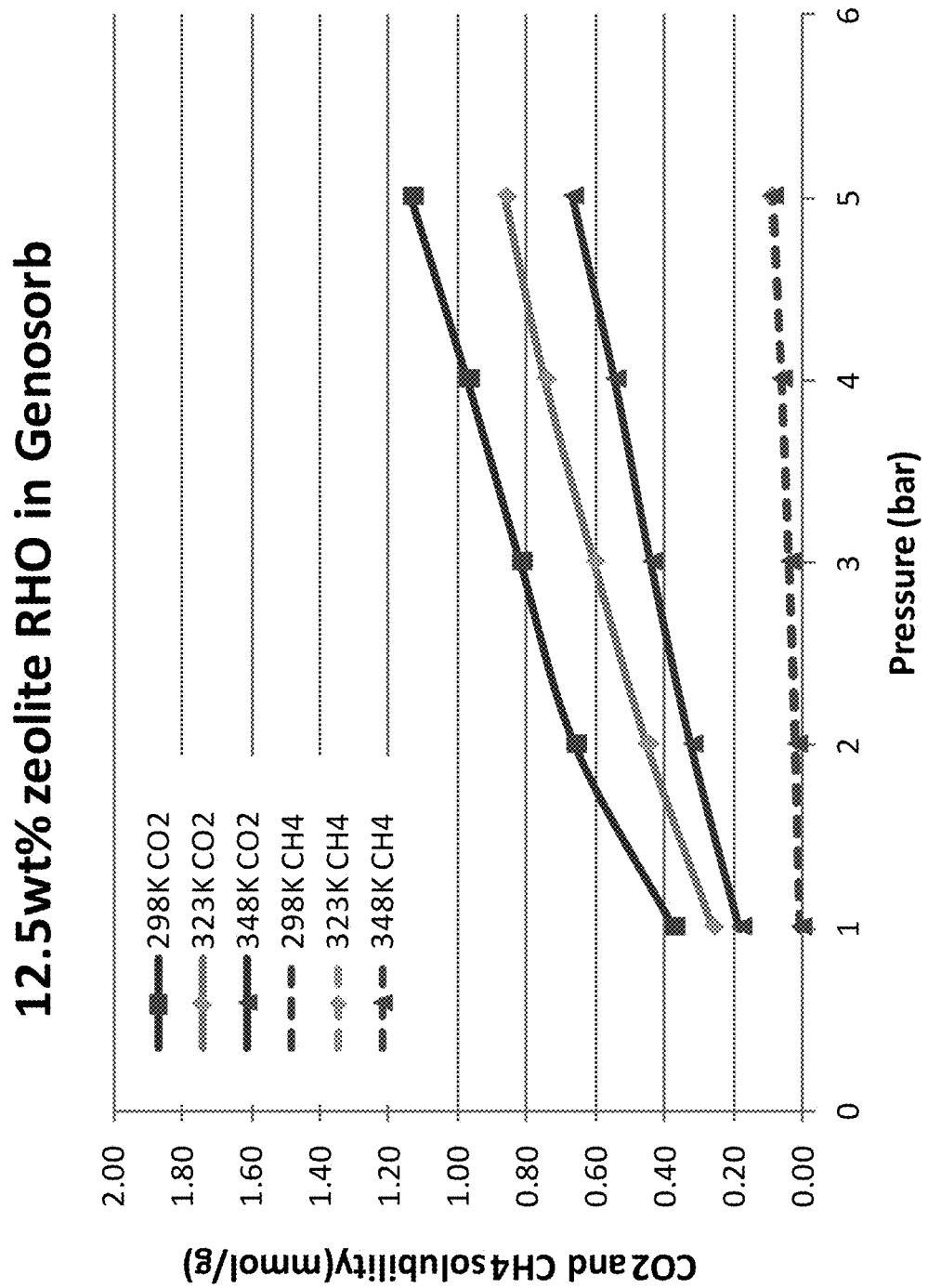
FIG. 4 shows the $CO_2$ uptake of a 12.5 wt % dispersion of zeolite Rho in Genosorb 1753 at three different temperatures and at pressures of from 1-5 bar.
Figure 5:
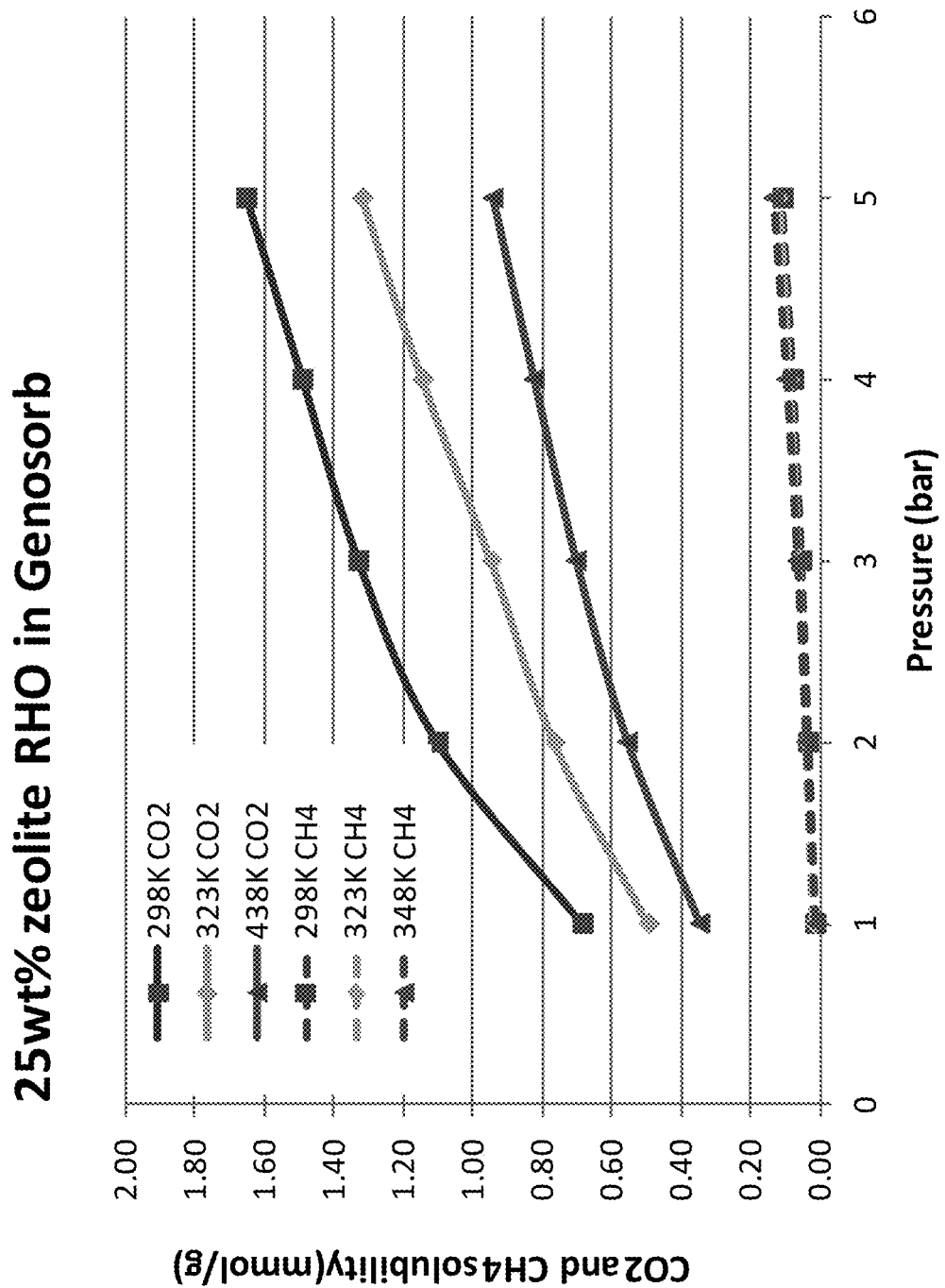
FIG. 5 shows the $CO_2$ uptake of a 25 wt % dispersion of zeolite Rho in Genosorb 1753 at three different temperatures and at pressures of from 1-5 bar.

All the measurements were carried out from 1 to 5 bar at 298K, 323K and 348K. The high pressure measurements also show predictable outcomes. Table 2 below, and FIGS. 3-5, show the $CO_2$ uptake of Genosorb 1753, a 12.5 wt % dispersion of zeolite Rho in Genosorb 1753 and a 25 wt % dispersion of zeolite Rho in Genosorb 1753. Table 3 below shows the experimental values for pure zeolite Rho at 298K, plus the predicted values for the 12.5 wt % zeolite Rho in Genosorb 1753 and 25 wt % zeolite Rho in Genosorb 1753 dispersions.

The measured $CO_2$ solubility of the dispersions is comparable to its predicted value at low pressure but slightly less than the predicted value at high pressure. The high pressure gas uptake measurements show that the addition of zeolite Rho to Genosorb 1753 solvent significantly enhances $CO_2$ uptake and the operational range for a temperature pressure swing adsorption/desorption system.

TABLE 2

|  | Genosorb | | | 12.5 wt % Zeolite Rho in Genosorb | | | 25 wt % Zeolite Rho in Genosorb | | |
|---|---|---|---|---|---|---|---|---|---|
|  | 298K | 323K | 348K | 298K | 323K | 348K | 298K | 323K | 348K |
| 1 bar | 5.478 | 5.044 | 3.669 | 16.457 | 11.476 | 7.919 | 30.024 | 21.639 | 15.234 |
| 2 bar | 11.331 | 9.687 | 7.423 | 29.015 | 19.852 | 14.160 | 48.327 | 33.558 | 24.342 |
| 3 bar | 17.493 | 14.571 | 11.727 | 35.968 | 36.580 | 19.339 | 58.322 | 41.623 | 30.804 |

TABLE 2-continued

|  | Genosorb | | | 12.5 wt % Zeolite Rho in Genosorb | | | 25 wt % Zeolite Rho in Genosorb | | |
| --- | --- | --- | --- | --- | --- | --- | --- | --- | --- |
|  | 298K | 323K | 348K | 298K | 323K | 348K | 298K | 323K | 348K |
| 4 bar | 24.221 | 19.598 | 16.206 | 42.717 | 32.829 | 24.000 | 65.377 | 50.361 | 36.102 |
| 5 bar | 31.471 | 25.089 | 20.853 | 49.862 | 37.909 | 29.408 | 72.444 | 58.028 | 41.274 |

TABLE 3

|  | 298K | | |
| --- | --- | --- | --- |
|  | Experimental pure Zeolite Rho | Theoretical 12.5 wt % Zeolite Rho | Theoretical 25 wt % Zeolite Rho |
| 1 bar | 108.12 | 18.31 | 31.14 |
| 2 bar | 170.00 | 31.16 | 51.00 |
| 3 bar | 200.57 | 40.38 | 63.26 |
| 4 bar | 216.69 | 48.28 | 72.34 |
| 5 bar | 228.68 | 56.12 | 80.77 |

Reversibility/Regeneration

Figure 6:
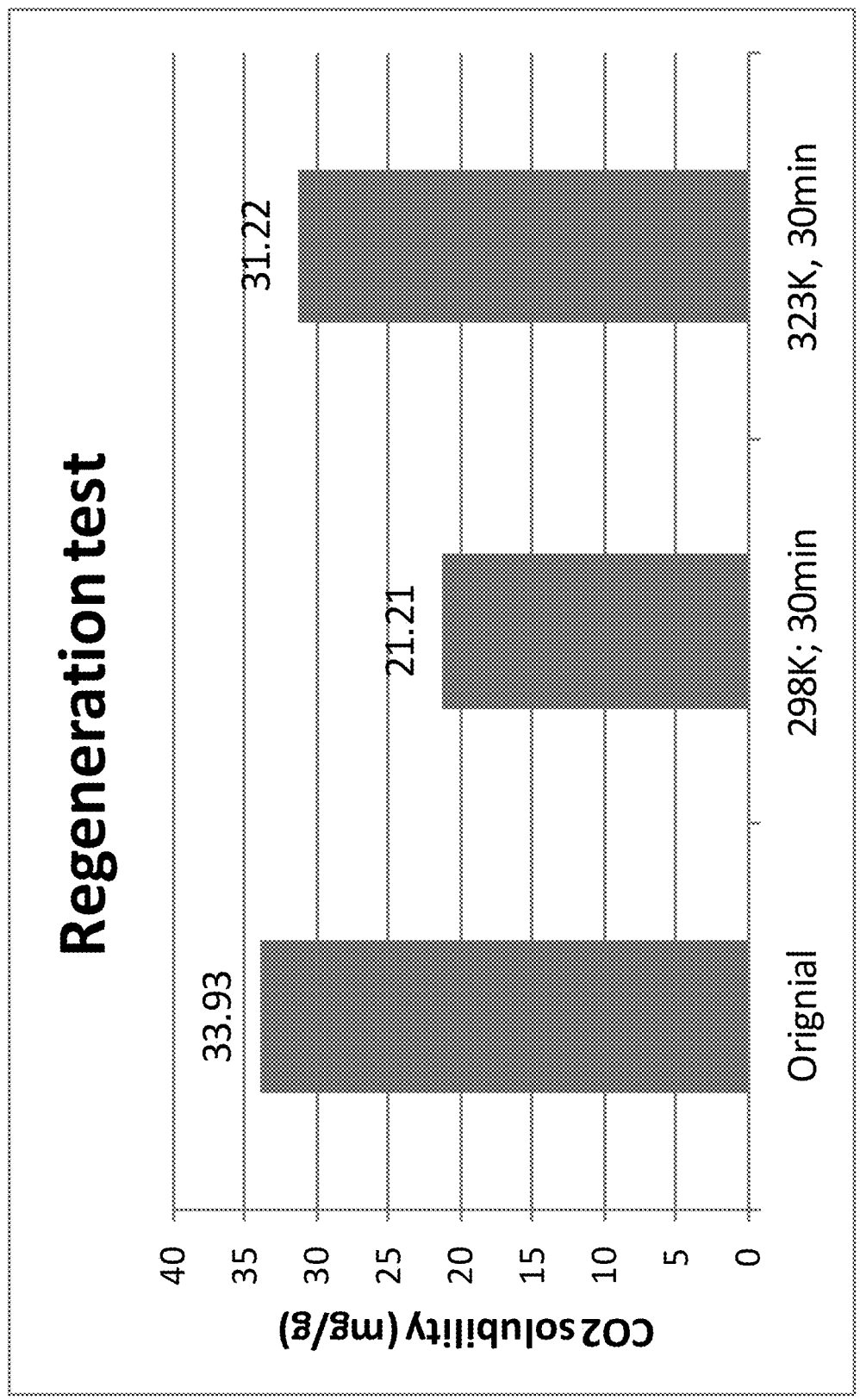
FIG. 6 shows the $CO_2$ solubility of a 12.5 wt % dispersion of zeolite Rho in Genosorb 1753 before use, after use and regeneration at 25° C., and after use and regeneration at 50° C.
Figure 7:
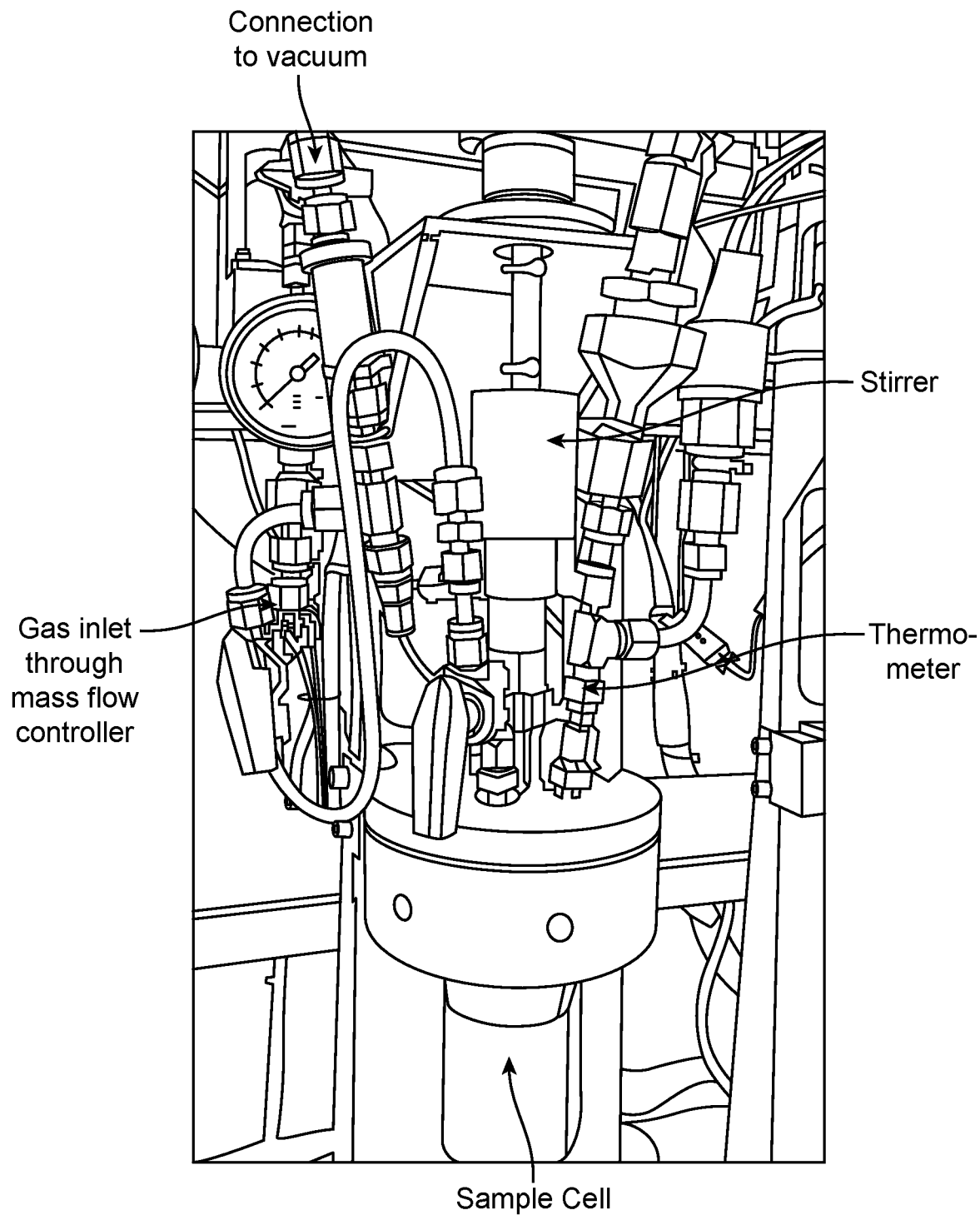
FIG. 7 shows a Parr reactor used in the high pressure gas update studies.

Ease of material regeneration is a useful property which can provide a reduction in regeneration cost. It is difficult to achieve by amine-based technology nowadays due to the high energy penalty. The dispersions of the invention are understood to be easily regenerated by applying mild heating or vacuum. As shown in FIG. 6, the porous liquid (12.5 wt % zeolite RHO in Genosorb 1753) shows about a 62.5% recovery in $CO_2$ uptake capacity when it has undergone a room temperature regeneration under vacuum for 30 minutes. However, $CO_2$ uptake capacity recovers to around 92% when the same regeneration conditions are used, but the temperature is increased to 50° C.

Additional $CO_2$ Uptake Studies

Further dispersions comprising combinations of porous particles with various liquids were prepared by mixing the porous particles with the liquid as described above. The dispersions produced, and their theoretical and actual $CO_2$ uptake values in mg/g, are shown in Tables 4a-c below.

TABLE 4a

|  |  | Polyethylene glycol dimethyl ether (Genosorb 1753) - $CO_2$ uptake mg/g (mmol/g) | | Polyethylene glycol dimethyl ether (Genosorb 300) - $CO_2$ uptake mg/g (mmol/g) | | Polyethylene glycol dimethyl ether (Genosorb 1900) - $CO_2$ uptake mg/g (mmol/g) | Polyethylene glycol dibutyl ether (Genosorb 1843) - $CO_2$ uptake mg/g (mmol/g) | | |
| --- | --- | --- | --- | --- | --- | --- | --- | --- | --- |
|  | Wt % | Exp. | Cal. | Exp. | Cal. | Exp. | Exp. | Cal. | Cal. |
|  |  | 9.23 (0.21) |  | 5.64 (0.13) |  | 6.7 (0.15) | 7.3 (0.17) |  |  |
| Zeolite Rho | 12.5 | 22.58 (0.51) | 22.64 (0.51) | 16.18 (0.37) | 18.61 (0.42) | 15.93 (0.36) | 19.6 (0.45) | 19.24 (0.44) | 20.14 (0.46) |
|  | 25 | 33.2 (0.75) | 33.6 (0.76) | — | — | — | — | — | — |
| PAF-1 | 12.5 | 31.91 (0.76) | 31.23 (0.71) | — | — | — | — | — | — |
| ZIF-8 | 12.5 | 5.64 (0.13) | 13.04 (0.30) | — | — | — | — | — | — |
| Al(fum)(OH) | 12.5 | 11.78 (0.27) | 20.12 (0.46) | — | — | — | — | — | — |

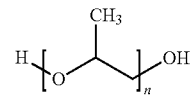

|  |  | Polypropylene glycol - $CO_2$ uptake mg/g (mmol/g) | |
| --- | --- | --- | --- |
|  | Wt % | Exp. | Cal. |
| Zeolite Rho | 12.5 | 15.69 (0.36) | 18.96 (0.43) |
|  | 25 | — | — |
| PAF-1 |  | — | — |
| ZIF-8 |  | — | — |
| Al(fum)(OH) |  | — | — |

TABLE 4b

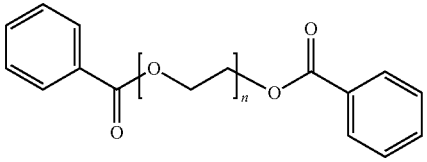

| | | polyethylene glycol dibenzoate - $CO_2$ uptake mg/g (mmol/g) | | Polyethylene glycol bis(2-ethylhexanoate) - $CO_2$ uptake mg/g (mmol/g) | |
|---|---|---|---|---|---|
| | Wt % | Exp. | Cal. | Exp. | Cal. |
| Zeolite Rho | 12.5 | 2.8 (0.063) 16.65 (0.39) | 17.01 (0.39) | 7.91 (0.18) 14.23 (0.33) | 21.48 (0.49) |
| ZIF-8 | 25 | — | — | — | — |
| | 12.5 | 6.7 (0.15) | 7.05 (0.16) | 11.30 (0.26) | 11.52 (0.26) |
| Al(fum)(OH) | 25 | — | — | 14.84 | 15.13 |
| | 12.5 | — | — | — | — |
| Zeolite 10A | 12.5 | — | — | — | — |

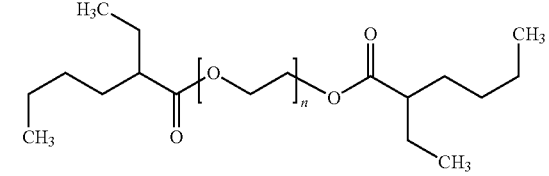

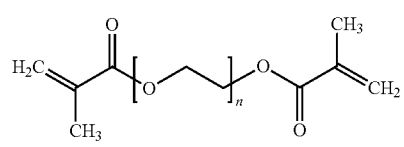

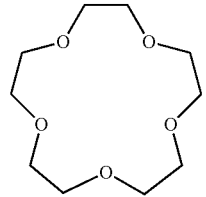 [SMILES: C1COCCOCCOCCOCCO1]

| | | poly(ethylene glycol) dimethacrylate - $CO_2$ uptake mg/g (mmol/g) | | 15-crown-5 - $CO_2$ uptake mg/g (mmol/g) | | Silicone oil (50cst) - $CO_2$ uptake mg/g (mmol/g) | |
|---|---|---|---|---|---|---|---|
| | Wt % | Exp. | Exp. | Exp. | Cal. | Exp. | Cal. |
| Zeolite Rho | 12.5 | 4.53 (0.10) — | — | 4.37 (0.099) 18.71 (0.43) | 17.57 (0.40) | 9.38 (0.21) 20.23 (0.46) | 18.92 (0.43) |
| ZIF-8 | 25 | — | — | — | — | — | — |
| | 12.5 | 7.41 (0.17) | 8.91 (0.20) | 4.40 (0.10) | 9.68 (0.22) | 9.68 (0.22) | 9.24 (0.21) |
| Al(fum)(OH) | 25 | — | — | — | — | — | — |
| | 12.5 | — | — | — | — | 15.84 (0.36) | 16.28 (0.37) |
| Zeolite 10A | 12.5 | — | — | — | — | 20.25 (0.46) | 20.68 (0.47) |

TABLE 4c

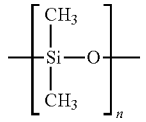

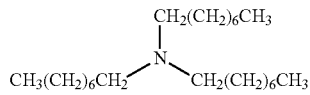

| | | Trioctylamine - $CO_2$ uptake mg/g (mmol/g) | | 2-(tert-butylamino)ethyl methacrylate - $CO_2$ uptake mg/g (mmol/g) | |
|---|---|---|---|---|---|
| | Wt % | Exp. | Cal. | Exp. | Cal. |
| Zeolite Rho | 12.5 | 2.92 (0.066) 18.85 (0.43) | 17.12 (0.39) | 6.33 (0.14) 15.44 (0.35) | 20.10 (0.46) |

TABLE 4c-continued

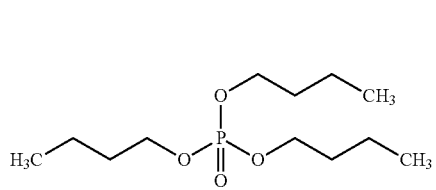 [SMILES: CCCCOP(=O)(OCCCC)OCCCC]
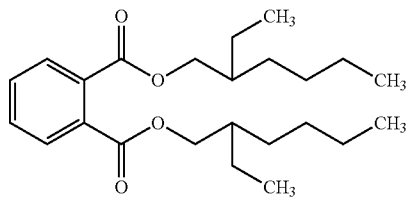 [SMILES: CCCCC(CC)COC(=O)c1ccccc1C(=O)OCC(CC)CCCC]

| | | Tributyl phosphate - CO₂ uptake mg/g (mmol/g) | | Dioctyl phthalate - CO₂ uptake mg/g (mmol/g) | |
|---|---|---|---|---|---|
| | Wt % | Exp. | Exp. | Exp. | Cal. |
| | | 2.65 (0.06) | | 3.54 (0.09) | |
| Zeolite Rho | 12.5 | 17.65 (0.40) | 16.88 (0.38) | 18.71 (0.43) | 17.66 (0.40) |

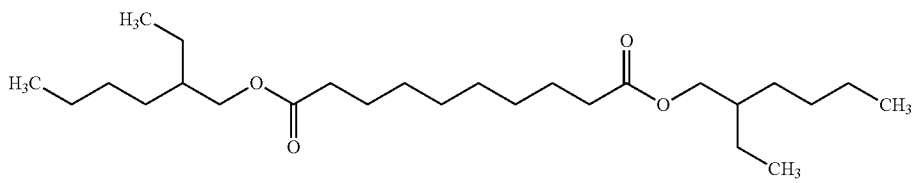 [SMILES: CCCCC(CC)COC(=O)CCCCCCCCC(=O)OCC(CC)CCCC]

| | | Bis(2-ethylhexyl) sebacate - CO₂ uptake mg/g (mmol/g) | |
|---|---|---|---|
| | | Exp. | Cal. |
| | | 9.38 (0.21) | |
| Zeolite Rho | 12.5 | 23.65 (0.54) | 22.77 (0.52) |

CH₄ Uptake

CH₄ uptake of the dispersions was also investigated and the results are shown in Table 5 below. This was carried out using the isochoric method described above (ie S. L. James et. al.; *Nature*, 527, 216).

TABLE 5

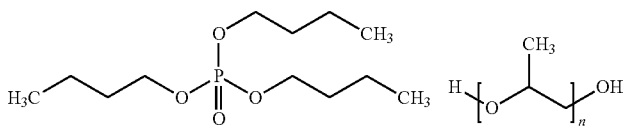

| Table 4c | | Tributyl phosphate - CH₄ uptake mg/g (mmol/g) | | Polypropylene glycol - CH₄ uptake mg/g (mmol/g) | |
|---|---|---|---|---|---|
| | Wt % | Exp. | Cal. | Exp. | Exp. |
| | | — | | 0.457 (0.028) | |
| Zeolite Rho | 12.5 | 0.181 (0.011) | — | 0.466 (0.029) | 0.502 (0.031) |
| | 25 | — | — | 0.506 (0.031) | 0.547 (0.034) |

Selectivity

Selectivity is estimated by ratio ($A_{mmol/g}/B_{mmol/g}$). Values for $CO_2$ selectivity over $CH_4$ ($CO_2/CH_4$) were calculated for two of the dispersions and the results are shown in Table 6 below.

TABLE 6

|  |  | Tributyl phosphate - $CO_2/CH_4$ selectivity (by 1:1 ratio) | | Polypropylene glycol - $CO_2/CH_4$ selectivity (by 1:1 ratio) | |
|---|---|---|---|---|---|
|  | Wt % | Exp. | Cal. | Exp. | Exp. |
| Zeolite | 12.5 | c.a. 36.4 | — | c.a. 7.5 c.a. 17.6 | c.a. 16.5 |
| Rho | 25 | — | — | c.a. 24.1 | c.a. 22.4 |

The invention claimed is:

1. A dispersion comprising porous particles dispersed in a liquid, wherein the porous particles comprise a zeolite with a mean pore diameter of 1.9 Ångstroms to 4.0 Ångstroms and the liquid does not enter the pores of the zeolite.

2. The dispersion as claimed in claim 1, wherein the zeolite is selected from the group consisting of zeolite Rho, zeolite Na-Rho, ECR-18, ZSM-25 and PST-20.

3. The dispersion as claimed in claim 1, wherein the zeolite is zeolite Rho.

4. The dispersion as claimed in claim 1, wherein the liquid is selected from a glycol, 15-crown-5, trioctylamine, 2-(tert-butylamino)ethyl methacrylate, tributyl phosphate, dioctyl phthalate and bis(2-ethylhexyl) sebacate.

5. The dispersion as claimed in claim 4, wherein the glycol is a polyalkylene glycol.

6. The dispersion as claimed in claim 5, wherein the polyalkylene glycol is a polyethylene glycol or a polypropylene glycol.

7. The dispersion as claimed in claim 6, wherein the polyethylene glycol is selected from a polyethylene glycol dialkyl ether and a polyethylene glycol carboxylate.

8. The dispersion as claimed in claim 7, wherein the polyethylene glycol dialkyl ether is selected from a polyethylene glycol dimethyl ether and a polyethylene glycol dibutyl ether.

9. The dispersion as claimed in claim 1 comprising 0.1-50 wt % of the porous particles.

10. The dispersion as claimed in claim 9 comprising 10-30 wt % of the porous particles.

11. A method of adsorbing a gas into a liquid, comprising at least the step of bringing the gas into contact with a dispersion as claimed in claim 1.

12. The method of adsorbing a gas into a liquid as claimed in claim 11, wherein the gas is selected from $CO_2$ and $CH_4$.

13. A method of preparing a dispersion as claimed in claim 1, comprising at least the step of:
mixing (i) porous particles comprising the zeolite, and (ii) the liquid.

14. An assemblage of a dispersion as claimed in claim 1, the zeolite comprising a cavity and a gas contained within the cavity.

15. The assemblage as claimed in claim 14, wherein the gas is selected from $CO_2$ and $CH_4$.

16. A dispersion comprising porous particles dispersed in a liquid phase, wherein the porous particles comprise a zeolite and the liquid phase is a size-excluded liquid, wherein the zeolite is selected from the group consisting of zeolite Rho, zeolite Na-Rho, ECR-18, ZSM-25 and PST-20.

17. The dispersion as claimed in claim 16, wherein the zeolite is zeolite Rho.

18. The dispersion as claimed in claim 16, wherein the size-excluded liquid is selected from the group consisting of a glycol, 15-crown-5, trioctylamine, 2-(tert-butylamino) ethyl methacrylate, tributyl phosphate, dioctyl phthalate and bis(2-ethylhexyl) sebacate.

19. The dispersion as claimed in claim 16 comprising 0.1-50 wt % of the porous particles.

20. The dispersion as claimed in claim 19 comprising 10-30 wt % of the porous particles.

* * * * *